US012775803B1

(12) United States Patent
Lattimer et al.

(10) Patent No.: US 12,775,803 B1
(45) Date of Patent: Oct. 27, 2026

(54) FACTUAL-CONSISTENCY DETECTION USING CHUNKING AND A NATURAL LANGUAGE INTERFERENCE MODEL

(71) Applicant: ASAPP, Inc., New York, NY (US)

(72) Inventors: Barrett Martin Lattimer, New York, NY (US); Pei-Hung Chen, Davis, CA (US); Xinyuan Zhang, Jersey City, NJ (US); Yi Yang, Long Island City, NY (US)

(73) Assignee: ASAPP, Inc., New York, NY (US)

( * ) Notice: Subject to any disclaimer, the term of this patent is extended or adjusted under 35 U.S.C. 154(b) by 181 days.

(21) Appl. No.: 18/736,362

(22) Filed: Jun. 6, 2024

Related U.S. Application Data

(60) Provisional application No. 63/522,908, filed on Jun. 23, 2023.

(51) Int. Cl.
*G06F 40/30* (2020.01)
*G06F 40/205* (2020.01)

(52) U.S. Cl.
CPC ............ *G06F 40/30* (2020.01); *G06F 40/205* (2020.01)

(58) Field of Classification Search
CPC ........ G06F 40/30; G06F 40/205; G06F 40/35; G06F 40/166; G06F 40/131; G06F 40/211; G06F 40/284; G06F 40/40; G06F 40/253; G06F 40/45; G06F 40/289; G06F 40/44; G06F 40/20; G06F 16/3329; G06F 16/345; G06F 16/3344; G06F 16/24578; G06F 16/334; G06F 16/243; G06F 3/0482; G06N 5/022
USPC .......................................................... 704/1–9
See application file for complete search history.

(56) References Cited

U.S. PATENT DOCUMENTS

| | | | | |
|---|---|---|---|---|
| 8,447,760 | B1 * | 5/2013 | Tong | G06F 16/24578 707/728 |
| 2010/0332424 | A1 * | 12/2010 | Bhattacharya | G06N 5/02 706/54 |
| 2016/0247068 | A1 * | 8/2016 | Lin | G06F 40/40 |
| 2021/0065573 | A1 * | 3/2021 | Rakshit | G06N 5/022 |
| 2021/0240776 | A1 * | 8/2021 | Jawagal | G06N 3/049 |

* cited by examiner

*Primary Examiner* — Leshui Zhang
(74) *Attorney, Agent, or Firm* — Lessani Law Group, PC

(57) ABSTRACT

Generative AI models exhibit remarkable potential. However, hallucinations across various tasks present a significant challenge, particularly for long inputs that current approaches struggle to address effectively. The present disclosure sets forth a factual-consistency detection method that can be used to determine if AI-generated text is factually consistent with a reference document. The method employs a novel chunking mechanism in which the reference document is divided into larger chunks (i.e., more than one sentence) and the AI-generated text is evaluated against each chunk for factual consistency. The use of chunks larger than a sentence improves both accuracy and efficiency. Additionally, a novel search tree approach that leverages chunking enables the system to provide support for a factual consistency decision by identifying the most relevant sentence(s) in the reference document while using fewer model runs than previous approaches.

14 Claims, 5 Drawing Sheets

Citing Sources for the AI-Generated Text

FACTUAL-CONSISTENCY DETECTION USING CHUNKING AND A NATURAL LANGUAGE INTERFERENCE MODEL

RELATED APPLICATIONS

This application claims the benefit of U.S. Provisional Application No. 63/522,908 filed on Jun. 23, 2023, and titled "Fast and Accurate Factual Inconsistency Detection over Long Documents," the contents of which are incorporated by reference herein as if fully disclosed herein.

BACKGROUND OF THE INVENTION

1. Field of the Invention

This invention relates to factual consistency detection using a natural language interference model. The invention may be used for real-time hallucination detection for AI-generated text.

2. Description of the Background Art

Large Language Models (LLMs) have shown immense promise in various applications, but deploying them in real-time presents certain challenges, such as hallucinations. Hallucinations or factual inconsistencies generated by a model relative to a reference document, can mislead the user and undermine trust in LLMs. Thus, detecting factual inconsistencies in LLM generations is crucial for the future of LLMs, especially with the growing popularity of platforms such as ChatGPT.

Prior research on hallucination detection has predominantly dealt with short documents in offline settings and relied heavily on sentence-level matching techniques. Specifically, in these prior art approaches, the LLM-generated text is compared offline to each sentence in the reference document. Consequently, these methods exhibit slow performance in processing longer documents and suffer from poor calibration. Such characteristics pose substantial challenges in implementing them in real-world online environments, where incorporating inconsistency detection could potentially result in a substantial increase in latency. Additionally, the absence of well-calibrated sources complicates the balancing act between mitigating the risk of incorporating hallucinations and excluding pertinent information from the model output. Given the exponential growth in context sizes (maximum allowed tokens of input) of contemporary LLMs, there is an increasing urgency to develop efficient and effective approaches for inconsistency detection in lengthy documents.

SUMMARY OF THE DISCLOSURE

The present disclosure describes a method, performed by a computer system and implemented in software, for factual inconsistency detection. The method is directed to determining whether a first text is factually consistent with a second text. The method may be used for real-time hallucination detection for AI-generated text.

The method begins by the system accessing a first text and a second text. The first text may be an AI-generated text, which can comprise one or more sentences. The second text acts as a reference document or fact source against which the first text's factual consistency is evaluated.

The second text is divided into a plurality of chunks. Each chunk comprises a plurality of sentences. Each chunk and the first text are inputted into a natural language interference model in order to calculate an entailment score for each chunk relative to the first text. The entailment score for a chunk relative to the first text represents the probability that the first text is supported by the chunk.

A factual consistency score is calculated based on the entailment scores for each of the chunks relative to the first text. The factual consistency score is used to determine whether the first text is consistent with the second text.

To produce explainable and interpretable scores for factual consistency and empower necessary human inspection, it is useful to justify the score by retrieving the most relevant portions of the second text that support the first text. As a baseline, the system could return the chunk with the highest entailment score as proof of factual consistency. However, if the chunk size used to determine factual consistency is large (e.g., a 1000 tokens or more), it may be desirable to drill down to a smaller chunk or even a single sentence to enable the user to easily verify factual consistency by reading a sentence or two. In one embodiment, the retrieval task involves finding the portion of the second text that is the most relevant to the first text (e.g., the AI-generated text), where this portion is smaller than the chunk size used to determine factual consistency. Using a novel search tree approach enabled by chunking, the system is able to retrieve the most relevant sentence(s) in context while using fewer model runs than previous approaches. Using a greedy search tree, the first text is evaluated against progressively smaller chunks of the second text to extract the portion of the second text that best supports the first text.

DETAILED DESCRIPTION OF THE PREFERRED EMBODIMENTS

The present disclosure describes a method, performed by a computer system and implemented in software, for factual inconsistency detection. The method is directed to determining whether a first text is factually consistent with a second text. The method may be used for real-time hallucination detection for AI-generated text.

1. Factual-Consistency Detection Method

Figure 1:
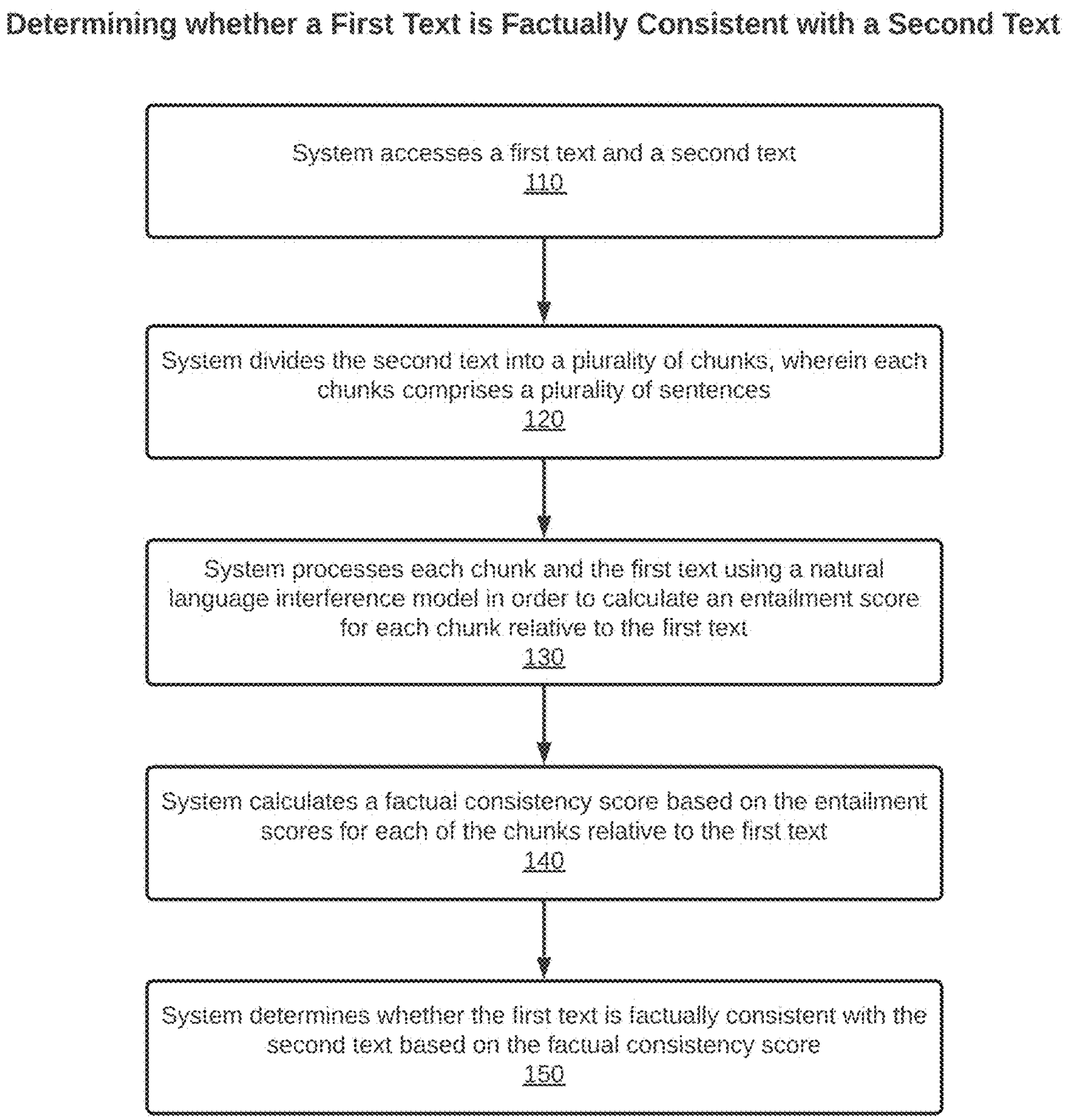
FIG. 1 is a flowchart that illustrates a method, according to one embodiment, for determining whether a first text is factually consistent with a second text.

FIG. 1 illustrates a method for determining whether a first text is factually consistent with a second text.

1.1 Accessing a First and Second Text

The method begins by the system accessing a first text and a second text (step 110). As described with respect to FIG. 2, the first text may be an AI-generated text, which can comprise one or more sentences. The second text acts as a reference document or fact source against which the first text's factual consistency is evaluated.

1.2 Dividing the Second Texts into Chunks

The system divides the second text into a plurality of chunks (step 120). Each chunk comprises a plurality of sentences. In one embodiment, a chunk comprises at least 1000 tokens.

1.3 Processing the Chunks Using a Natural Language Inference Model

The system processes each chunk and the first text using a natural language interference (NLI) model in order to calculate an entailment score for each chunk relative to the first text (step 130). An example of a natural language interference model is the Flan-T5 Model published by GOOGLE. The entailment score for a chunk relative to the first text represents the probability that the first text is supported by the chunk. For each chunk, the system inputs the chunk and the first text into the model and prompts it to evaluate whether the first text is supported by the chunk. In one embodiment, the model outputs a set of logits, which are then processed through a normalizing function (e.g., a SoftMax function) to obtain an entailment score for each chunk relative to the first text. Mathematically, this is expressed as follows:

The system obtains the probability that a chunk $c_i$ entails a first text $g_i$ through the following steps. First logits are obtained, by prompting the natural language inference model M with the following: logits=M("{$c_i$}Question: does this imply '{$g_i$}'?Yes or no?")

In one embodiment, the entailment score between $g_i$ and $c_i$ is then calculated by:

$$P_{entail} = \text{SoftMax}(\text{logits}[\text{“Yes”}], \text{logits}[\text{“No”}])[0]$$

1.4 Calculating a Factual Consistency Score

The system calculates a factual consistency score based on the entailment scores calculated in step 130 (step 140). In one embodiment, the factual consistency score is the maximum of the entailment scores.

1.5 Factual Consistency Decision

The system determines whether the first text is factually consistent with the second text based on the factual consistency score (step 150). For example, the system may compare the factual consistency score to a predetermined threshold. If the score exceeds the threshold, then the first text is deemed factually consistent with the second text. Otherwise, the first text is deemed to be inconsistent with the second text. In an embodiment where the entailment scores range from 0-1, an example threshold is 0.5.

1.6 Advantages over Prior Art Sentence-Matching Techniques

This method has a number of advantages over the prior art sentence-level matching techniques. These advantages include, but are not limited to, better capture of context in the document and significantly more computational efficiency. In a reference document (the second text), the information needed to support the first text may be distributed across several sentences. By dividing the reference document into chunks comprising multiple sentences, the present invention better captures context in the reference document that is missing in sentence-level matching approaches. This results in better performance and accuracy in the factual consistency detection, as shown in the experiments set forth in the provisional application incorporated by reference herein. Furthermore, dividing the reference document into larger chunks requires significantly less calls to the natural inference model than the sentence-matching approach. If the reference document is very large (e.g., a million or more tokens long), the sentence-matching approach is likely too computationally expensive to be commercially viable. It is significantly less computationally expensive to divide the reference document into larger chunks (e.g., a thousand or more tokens) and to perform factual consistency checks over the larger chunks. These efficiency gains make it feasible to use the method for real-time hallucination detection of LLMs with increasingly larger context size, as opposed to offline detection for sentence-matching techniques.

Figure 2:
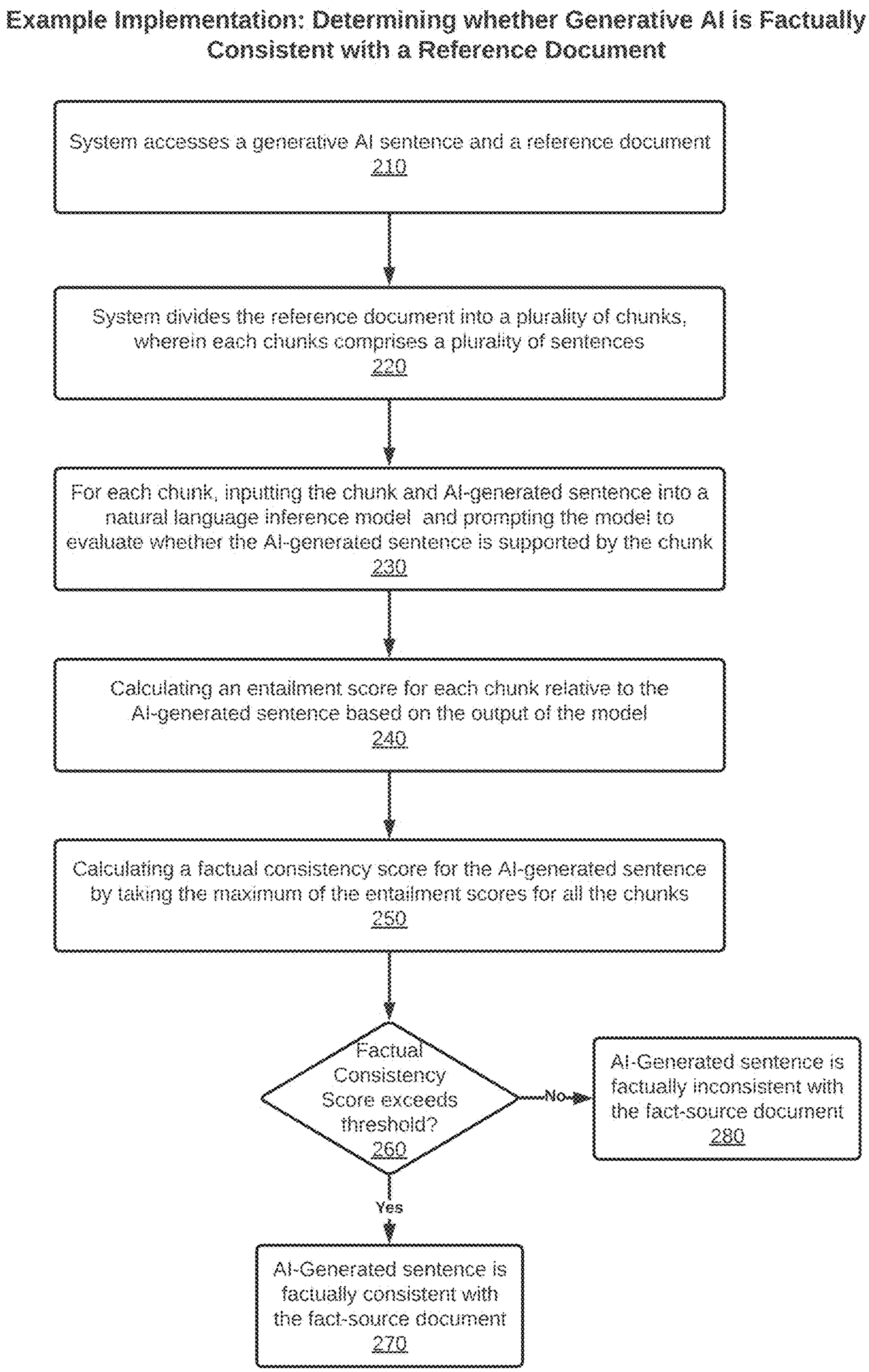
FIG. 2 is a flowchart that illustrates a method, according to one embodiment, for determining whether AI-generated text is consistent with a reference document.

2. Example Implementation: Real-Time Hallucination Detection for AI-Generated Text FIG. 2 illustrates how the method of FIG. 1 may be used for real-time hallucination detection for AI-generated text. In one embodiment, the steps in FIG. 2 are performed in response to a generative AI model, such as an LLM, generating a sentence and prior to displaying the sentence to a human user.

2.1 Accessing AI-generated Sentence and Reference Document

The system accesses an AI-generated sentence and a reference document (step 210). In one embodiment, step 210 happens in response to an LLM model generating a sentence.

2.2 Dividing Reference Document into Chunks

The system divides the references document into a plurality of chunks (step 220). Each chunk includes a plurality of sentences. In one embodiment, each chunk is at least 1000 tokens long.

2.3 Evaluating Each Chunk for Support Using NLI Model

For each chunk, the system inputs the chunk and the sentence into an NLI model and prompts the model to evaluate whether the AI-generated sentence is supported by the chunk (step 230). The system calculates an entailment score for each chunk relative to the AI-generated sentence based on the output of the model (step 240). In one embodiment, the output of the NLI model are logits, and the entailment score is obtained by applying a SoftMax function to the logits.

2.4 Factual Consistency Decision

In one embodiment, the system calculates a factual consistency score for the AI-generated sentence by taking the maximum of the entailment scores for all the chunks (step 250). The factual consistency score is then compared to a pre-established threshold (step 260). If the score exceeds the threshold, the system concludes that the AI-generated sentence is factually consistent with the reference document (step 270). If the score is below the threshold, the system concludes that the AI-generated text is factually inconsistent with the reference document (step 280).

In certain embodiments, the steps of FIG. 2 are performed in substantially real-time as the generative AI model generates content, and only AI-generated sentences that satisfy the factual consistency threshold are displayed to human users.

2.6 Repeat for Additional Sentences

In one embodiment, the steps of FIG. 2 are repeated for each sentence generated by the generative AI model. In an alternate embodiment, the steps in FIG. 2 are performed for a plurality of AI-generated sentences at a time (i.e., the first text may comprise multiple sentences).

An example of an NLI model is an LLM. The NLI model and the model that produced the AI-generated text may be the same model.

2.7 Example Depiction

Figure 3:
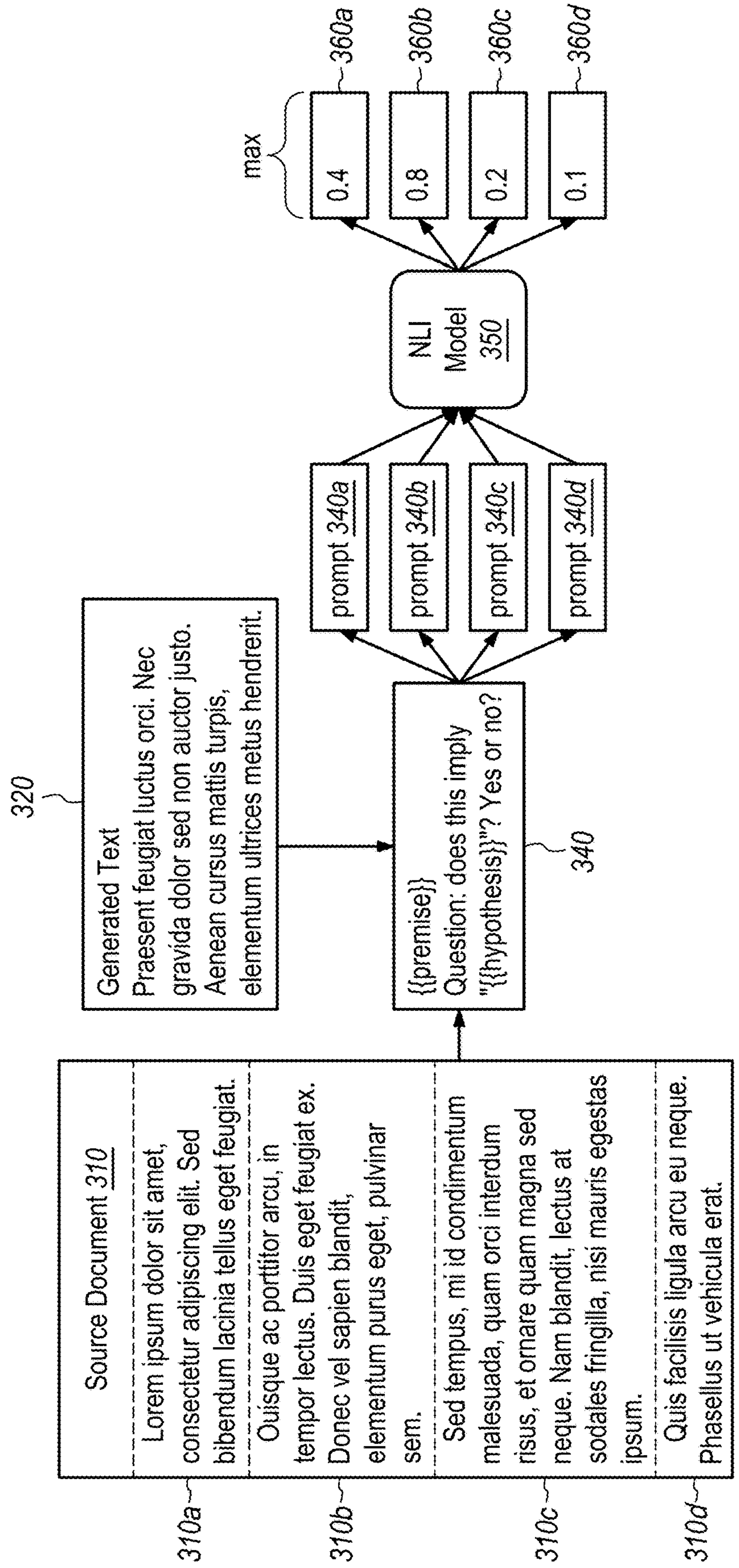
FIG. 3 illustrates an example depiction of the method of FIG. 2.

FIG. 3 illustrates an example depiction of the method of FIG. 2. A sentence from AI-generated text (320) is evaluated against a reference document (310). Specifically, reference document (310) is divided into chunks 310*a*-310*d*. For each chunk, the NLI model (350) is prompted (340*a*-340*d*) to evaluate whether the AI-generated text is supported by the chunk. Based on the output of the model, an entailment score (360*a*-360*d*) is calculated for each chunk, representing the probability that the AI-generated text is factually consistent with the chunk.

3. Model Explanation Via Relevant Source Text Retrieval

Figure 4:
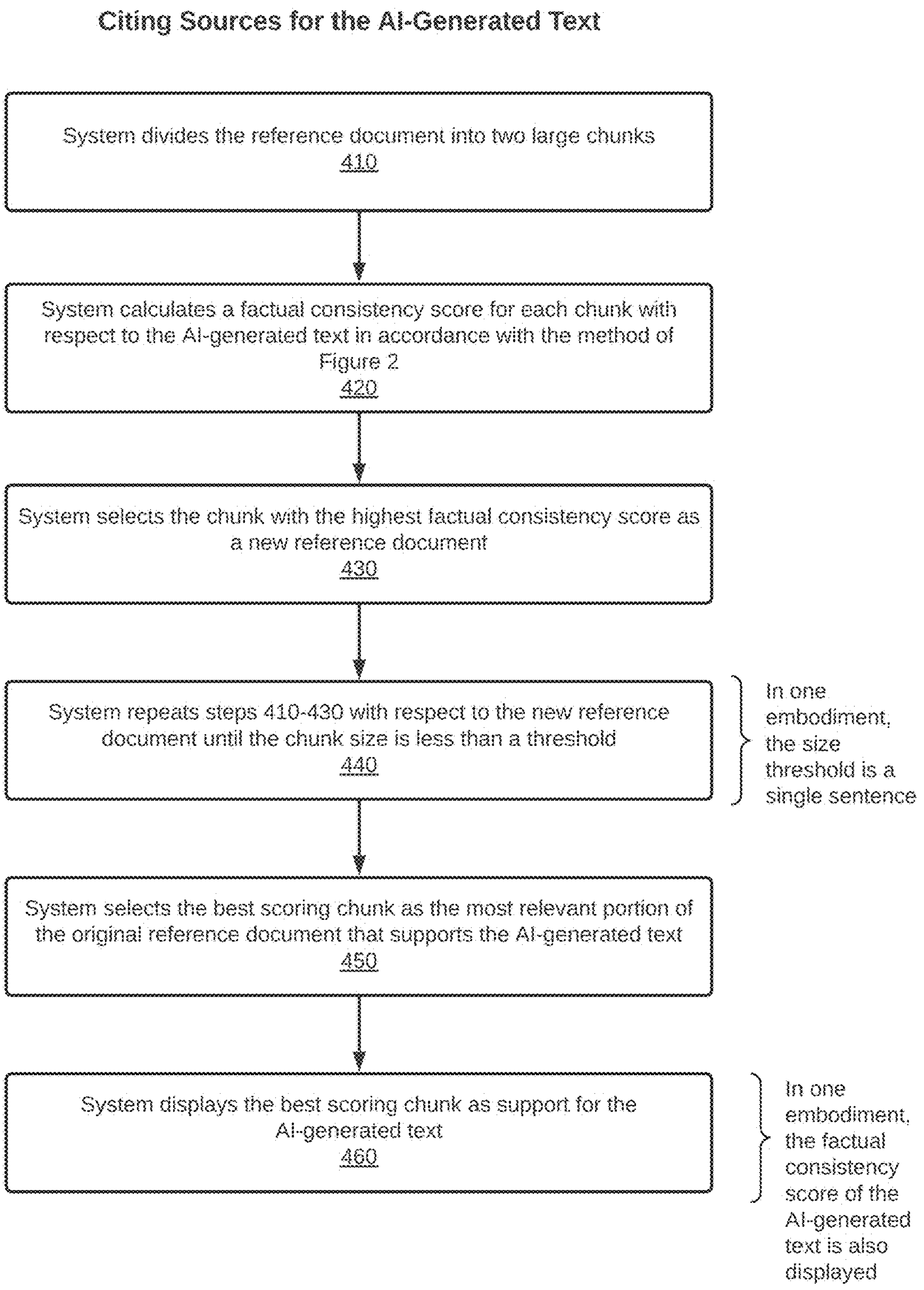
FIG. 4 is a flowchart that illustrates a method for identifying the portion of a reference document that best supports AI-generated text.
Figure 5:
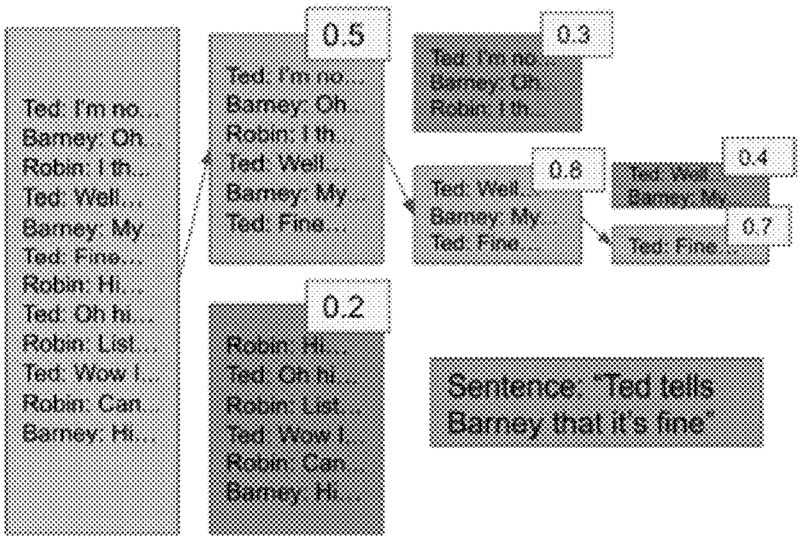
FIG. 5 illustrates an example depiction of the method of FIG. 4.

To produce explainable and interpretable scores for factual consistency and empower necessary human inspection, it is useful to justify a factual consistency decision by retrieving relevant text from the reference document. In one embodiment, the retrieval task involves finding the sentence or chunk in the reference document that is the most relevant to the AI-generated text (i.e., best supports the AI-generated text). As a baseline, the system could return the chunk with the highest entailment score as proof of factual consistency. However, if the chunk size used to determine factual consistency is large (e.g., a 1000 tokens or more), it may be desirable to drill down to a smaller chunk or even a single sentence to enable the user to easily verify factual consistency by reading a sentence or two. Using a novel search tree approach enabled by chunking, the system is able to retrieve the most relevant sentence or smaller chunk in context while using fewer model runs than previous approaches. This approach is illustrated in FIGS. 4 and 5.

The system uses a greedy search tree, such as a binary search tree, to identify the most relevant text in the reference document that supports the AI-generated text. Specifically, the AI-generated text is evaluated against progressively smaller chunks to find highly relevant text from the reference document. The process begins by dividing the original reference document into two large chunks (step 410). For each of the chunks, the system calculates the factual consistency score between the chunk and the AI-generated text (step 420). The factual consistency scores are calculated using the method of FIG. 2. The chunk with the highest factual consistency score becomes the new reference document for purposes of this process (step 430). The new reference document is then divided into two chunks, and the process continues until the chunk size becomes sufficiently low (e.g., 1-3 sentences) (step 440). The threshold chunk size for purposes of step 440 is smaller than the chunk size used to determine factual consistency in the method of FIGS. 1 and 2. Steps 410-450 are visualized in the example of FIG. 5. The best scoring chunk is then chosen to be the supporting proof that the AI-generated text is factually consistent with the reference document (step 450). The system displays the best scoring chunk as support for the AI-generated text (step 460). In certain embodiments, the system may display a plurality of the best-scoring chunks as support for the AI-generated text. In certain embodiments, the system also displays the factual-consistency score of the AI-generated text.

Even though factual consistency is determined by evaluating the AI-generated texts against chunks larger than a sentence, this novel search tree approach that leverages chunking enables the system to identify the single sentence in the reference document that is the most relevant to the AI-generated text. Although FIG. 4 is described with respect to AI-generated text, the method could apply to any text.

This approach is able to significantly reduce the amount of model calls needed to find relevant text from a reference document. Previous approaches break the reference document down by sentence which requires O(n) model calls for a reference document with n sentences. With the new approach described herein, only O(log(n)) model calls are required to find the most relevant sentence in the same reference document of n sentences.

4. General

The methods described herein are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for determining whether a first text is factually consistent with a second text, the method comprising:

generating a first text using a generative AI model, wherein the first text is AI-generated text and wherein the generative AI model is a Large Language Model (LLM);

accessing a second text and dividing the second text into a plurality of chunks, wherein each chunk comprises a plurality of sentences;

for each chunk, prompting a natural language inference model to evaluate whether the first text is supported by the chunk and calculating an entailment score for the chunk relative to the first text;

determining a factual consistency score based on the entailment scores for each of the chunks relative to the first text;

determining in substantially real time as the generative AI model generates the first text whether the first text is factually consistent with the second text based on the factual consistency score, wherein in response to determining that the first text is factually consistent with the second text, detecting no hallucination for the AI-generated text, and wherein in response to determining that the first text is not factually consistent with the second text, detecting hallucination for the AI-generated text; and outputting the AI-generated text to an end user only in response to detecting no hallucination for the AI-generated text.

2. The method of claim 1, wherein the first text is a sentence of AI-generated text.

3. The method of claim 1, wherein the second text is a reference document.

4. The method of claim 1, wherein, for each chunk, prompting a natural language inference model to evaluate whether the first text is supported by the chunk and calculating an entailment score for the chunk relative to the first text comprises the following:

inputting the chunk and the first text into the natural language inference model;

prompting the natural language interference model to evaluate whether the first text is supported by the chunk;

obtaining a set of logits from the natural language inference model in response to the model evaluating whether the first text is supported by the chunk; and applying a SoftMax function to the set of logits to obtain the entailment score for the chunk and the first text.

5. The method of claim 1, wherein the factual consistency score is the maximum of the entailment scores for the chunks relative to the first text.

6. The method of claim 1, wherein determining whether the first text is factually consistent with the second text comprises the following:

comparing the factual consistency score to a threshold;

in response to the factual consistency score being greater than the threshold, determining that the first text is factually consistent with the second text; and in response to the factual consistency score being less than the threshold, determining that the first text is factually inconsistent with the second text.

7. The method of claim 1 further comprising:

utilizing a search tree to identify the most relevant portion of second text that supports the first text; and displaying the portion of the second text identified as most relevant in a user interface as support for the AI-generated text.

8. The method of claim 7, wherein utilizing a search tree to identify a most relevant portion of the second text comprises the following:

(a) dividing a reference document into two chunks;

(b) calculating the factual consistency score for each chunk;

(c) selecting the chunk with the highest factual consistency score as a new reference document; and (d) repeating steps (a)-(c) with respect to the new reference document until chunk size is less than a threshold;

(e) selecting a highest scoring chunk as the most relevant portion of the second text that supports the first text.

9. A non-transitory computer-readable medium comprising a computer program, that, when executed by a computer system, enables the computer system to perform the following method for determining whether a first text is factually consistent with a second text, the method comprising:

generating a first text using a generative AI model, wherein the first text is AI-generated text and wherein the generative AI model is a Large Language Model (LLM);

accessing a second text and dividing the second text into a plurality of chunks, wherein each chunk comprises a plurality of sentences;

for each chunk, prompting a natural language inference model to evaluate whether the first text is supported by the chunk and calculating an entailment score for the chunk relative to the first text;

determining a factual consistency score based on the entailment scores for each of the chunks relative to the first text;

determining in substantially real time as the generative AI model generates the first text whether the first text is factually consistent with the second text based on the factual consistency score, wherein in response to determining that the first text is factually consistent with the second text, detecting no hallucination for the AI-generated text, and wherein in response to determining that the first text is not factually consistent with the second text, detecting hallucination for the AI-generated text; and outputting the AI-generated text to an end user only in response to detecting no hallucination for the AI-generated text.

10. The non-transitory computer-readable medium of claim 9, wherein, for each chunk, prompting a natural language inference model to evaluate whether the first text is supported by the chunk and calculating an entailment score for the chunk relative to the first text comprises the following:

inputting the chunk and the first text into the natural language inference model;

prompting the natural language interference model to evaluate whether the first text is supported by the chunk;

obtaining a set of logits from the natural language inference model in response to the model evaluating whether the first text is supported by the chunk; and applying a SoftMax function to the set of logits to obtain the entailment score for the chunk and the first text.

11. The non-transitory computer-readable medium of claim 9 further comprising:

utilizing a search tree to identify the most relevant portion of second text that supports the first text; and displaying the portion of the second text identified as most relevant in a user interface as support for the AI-generated text.

12. A computer system for determining whether a first text is factually consistent with a second text, the system comprising:

one or more processors;

one or more memory units coupled to the one or more processors, wherein the one or more memory units store instructions that, when executed by the one or more processors, cause the system to perform the operations of:

generating a first text using a generative AI model, wherein the first text is AI-generated text and wherein the generative AI model is a Large Language Model (LLM);

accessing a second text and dividing the second text into a plurality of chunks, wherein each chunk comprises a plurality of sentences;

for each chunk, prompting a natural language inference model to evaluate whether the first text is supported by the chunk and calculating an entailment score for the chunk relative to the first text;

determining a factual consistency score based on the entailment scores for each of the chunks relative to the first text;

determining in substantially real time as the generative AI model generates the first text whether the first text is factually consistent with the second text based on the factual consistency score, wherein in response to determining that the first text is factually consistent with the second text, detecting no hallucination for the AI-generated text, and wherein in response to determining that the first text is not factually consistent with the second text, detecting hallucination for the AI-generated text; and outputting the AI-generated text to an end user only in response to detecting no hallucination for the AI-generated text.

13. The computer system of claim 12, wherein, for each chunk, prompting a natural language inference model to evaluate whether the first text is supported by the chunk and calculating an entailment score for the chunk relative to the first text comprises the following:

inputting the chunk and the first text into the natural language inference model;

prompting the natural language interference model to evaluate whether the first text is supported by the chunk;

obtaining a set of logits from the natural language inference model in response to the model evaluating whether the first text is supported by the chunk; and applying a SoftMax function to the set of logits to obtain the entailment score for the chunk and the first text.

14. The computer system of claim 12 further comprising:

utilizing a search tree to identify the most relevant portion of second text that supports the first text; and displaying the portion of the second text identified as most relevant in a user interface as support for the AI-generated text.

* * * * *